United States Patent
Diaz

(10) Patent No.: US 7,570,688 B2
(45) Date of Patent: *Aug. 4, 2009

(54) NON-CHRONOLOGICAL SYSTEM STATISTICS

(75) Inventor: Raymond Diaz, Irvine, CA (US)

(73) Assignee: ADC DSL Systems, Inc., Eden Prairie, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/742,212

(22) Filed: Apr. 30, 2007

(65) Prior Publication Data

US 2007/0195872 A1  Aug. 23, 2007

Related U.S. Application Data

(63) Continuation of application No. 10/008,465, filed on Nov. 9, 2001, now Pat. No. 7,274,731.

(51) Int. Cl.
*H04B 1/38* (2006.01)
*H04L 5/16* (2006.01)

(52) U.S. Cl. .................. 375/222; 375/219; 379/88.09; 379/112.06; 709/201; 709/224

(58) Field of Classification Search ........... 375/219, 375/222; 379/112.06, 88.09; 709/201, 224
See application file for complete search history.

(56) References Cited

U.S. PATENT DOCUMENTS

| | | | |
|---|---|---|---|
| 5,551,025 A | 8/1996 | O'Reilly et al. | |
| 5,568,513 A | 10/1996 | Croft et al. | |
| 5,689,510 A | 11/1997 | Jacquet et al. | |
| 5,701,329 A | 12/1997 | Croft et al. | |
| 5,852,630 A | 12/1998 | Langberg et al. | |
| 5,872,810 A | 2/1999 | Philips | |
| 6,023,457 A | 2/2000 | Jacquet et al. | |
| 6,023,606 A | 2/2000 | Monte et al. | |
| 6,222,877 B1 | 4/2001 | Govindarajan | |
| 6,269,401 B1 | 7/2001 | Fletcher | |
| 6,278,730 B1 | 8/2001 | Tsui et al. | |
| 6,347,217 B1 | 2/2002 | Bengtsson et al. | |
| 6,580,254 B2 | 6/2003 | Schofield | |
| 6,647,109 B1 | 11/2003 | Henderson | |
| 7,274,731 B2 * | 9/2007 | Diaz | 375/222 |
| 2001/0030998 A1 | 10/2001 | Yong | |
| 2002/0105911 A1 * | 8/2002 | Pruthi et al. | 370/241 |
| 2002/0126803 A1 | 9/2002 | Jones et al. | |

* cited by examiner

*Primary Examiner*—Ted Wang
(74) *Attorney, Agent, or Firm*—Fogg & Powers LLC

(57) ABSTRACT

A communications device apparatus and method is detailed that allows for improved system statistics gathering of network communication links, dataports, and system status. The improved communications device apparatus and method utilizes a relative time reference or clock for the determination of the starting and ending of system statistics gathering time periods. Thus allowing for the contiguous gathering of system statistics without errors or gaps caused by time changes made to an absolute time reference.

16 Claims, 4 Drawing Sheets

NON-CHRONOLOGICAL SYSTEM STATISTICS

RELATED APPLICATIONS

This application is a continuation of U.S. patent application Ser. No. 10/008,465, filed Nov. 19, 2001 (currently pending), which is incorporated herein by reference.

TECHNICAL FIELD

The present invention relates generally to communications devices and in particular the present invention relates to system status and statistics in communications devices.

BACKGROUND

Modem networks and network systems are typically constructed of multiple differing devices, elements, or links, referred to collectively herein as elements. These elements include communications devices that connect networks and other elements across a link. Links can be virtual links that connect through other communications devices or physical links that connect across physical wire, cables, wireless, or optical connections. Links can be of multiple protocols and physical connections and signaling methods. Telecommunications devices are specialized communications devices that connect networks and elements across links that are part of a telecommunications or phone system. Examples of such include, but are not limited to, digital subscriber line (DSL), ethernet links, modems, token ring, network hubs, network switches, wide area network (WAN) bridges, integrated services digital network (ISDN) devices, T1 termination units, etc. In particular, one recent such communications link and protocol is global symmetric high bit rate digital subscriber loop (G.SHDSL, or G.991.2) promulgated by the international telecommunication union (ITU).

Communications devices can have many physical configurations and implementations. Two popular physical configurations are the standalone enclosure and the line card chassis. Standalone enclosures are typically used at end user sites or link terminal sites where only one device is required. Line card chassis are popular in network hubs or telecommunication offices where multiple communication links end and the density and central management capability of a line card chassis is an advantage.

Many communications devices have at least one other dataport or interface that are associated with the device. The other dataports associated with a communications device can be coupled to multiple local networks or to other large data bandwidth or long distance communication links that can be of differing protocols. The dataport(s) with the high data bandwidth or long distance link are typically known as the wide area network (WAN) dataports, and the dataports associated with local networks are known generally as the local area network (LAN) dataports. These dataports are usually coupled in various manners through the communications device to allow them to communicate data with each other.

Many communications devices collect information on system status, performance statistics, and/or error statistics, referred to generally as system statistics. These system statistics, particularly for a G.SHDSL communications device, can include, but are not limited to, error seconds (ES), severely errored seconds (SES), unavailable seconds (UAS), code violation (CV), and Loss of Sync Word Second (LOSWS) for each dataport, interface, or system. The system statistics are tracked and summarized in reporting periods that are of evenly spaced selected time intervals, such as in 10 or 15 minute intervals. To gain more storage efficiency for systems statistics, many communications devices generally store these detailed system statistics over a predetermined time period, such as the last day or 24 hour period, and then only store a set number of summarized records of these predetermined time periods. The system statistics storage in both the short and long term reporting periods are generally reused by the communications system in a first in first out manner, with the storage of the oldest statistics typically being reused for storage of the most recently gathered.

In communications devices, the start and end of the system statistics time intervals typically are marked or indicated by a chronological time reference or absolute time clock, generally referred to as an absolute time reference. In many systems and communications devices, the clocks or absolute time references are often updated or changed during system operation. The reasons for these updates are many but can include such things as daylight savings time, time reference drift correction, or system time synchronization across a network or across multiple devices. Often times the update of a clock or time reference will happen over the start or end of a system statistics reporting period because of proximity to the time or size of the adjustment. This situation can cause a reporting period to close early, run extra long, be merged into the previous/next reporting period, or to even be skipped entirely depending on system implementation and the circumstances of the time change. The result of this can be the erroneous or confusing reporting of system statistics and availability to administrators or management programs.

For the reasons stated above, and for other reasons stated below which will become apparent to those skilled in the art upon reading and understanding the present specification, there is a need in the art for a method and apparatus of conveniently changing and recording system statistics in communications devices in a network environment.

SUMMARY

The above-mentioned problems with conveniently operating, and updating communications devices to allow changing and recording system statistics are addressed by embodiments of the present invention and will be understood by reading and studying the following specification.

In one embodiment, a method of collecting performance statistics in a telecommunications device includes generating a sequence of time intervals from a relative time reference, gathering performance statistics on a telecommunications device over the duration of each time interval, and storing a summarized record of the telecommunications device performance statistics for the time interval at the conclusion of each selected time interval.

In another embodiment, a method of collecting performance statistics in a G.SHDSL compatible device includes generating a sequence of time intervals from a relative time reference, gathering performance statistics on a G.SHDSL compatible device over the duration of each time interval, and storing a summarized record of the G.SHDSL compatible device performance statistics for the time interval at the conclusion of each selected time interval.

In yet another embodiment, a method of collecting performance statistics in a G.SHDSL modem includes generating a sequence of fifteen minute time intervals from a relative time reference, gathering performance statistics on a G.SHDSL modem over the duration of each fifteen time minute interval, storing a summarized record of the G.SHDSL compatible device performance statistics for each fifteen minute time interval at the conclusion of each selected time interval over a twenty four hour period, and reporting the summarized record of one or more fifteen minute time intervals relative to a chronological time reference.

In a further embodiment, a telecommunications device includes at least one communication link interface, a relative time reference clock, a performance statistics monitor, wherein the performance statistics monitor gathers and stores performance statistics on the operation of the telecommunications device and the at least one communication link interface over the duration of a sequence of selected time intervals as defined by the relative time reference clock.

In yet a further embodiment, a G.SHDSL communications device includes at least one communication link interface, a relative time reference clock, a performance statistics monitor, wherein the performance statistics monitor gathers and stores performance statistics on the operation of the G.SHDSL communications device and the at least one communication link interface over the duration of a sequence of selected time intervals as defined by the relative time reference clock.

In another embodiment, a G.SHDSL modem includes a G.SHDSL communication link interface, a relative time reference clock, a performance statistics monitor, wherein the performance statistics monitor gathers and stores summarized performance statistics on the operation of the G.SHDSL modem and the G.SHDSL communication link interface over the duration of a sequence of fifteen minute time intervals in a twenty four hour period as defined by the relative time reference clock.

In yet another embodiment, a machine-usable medium has machine readable instructions stored thereon for execution by a processor of a telecommunications device to perform a method. The method includes generating a sequence of time intervals from a relative time reference, gathering performance statistics on a telecommunications device over the duration of each time interval, and storing a summarized record of the telecommunications device performance statistics for the time interval at the conclusion of each selected time interval.

In a further embodiment, a telecommunications device has at least one communication link interface, a relative time reference clock, and a performance statistics monitor, and a performance statistics monitor method. The performance statistics monitor method includes generating a sequence of time intervals from a relative time reference, gathering performance statistics on a telecommunications device over the duration of each time interval, and storing a summarized record of the telecommunications device performance statistics for the time interval at the conclusion of each selected time interval.

Other embodiments are described and claimed.

DETAILED DESCRIPTION

In the following detailed description, reference is made to the accompanying drawings that form a part hereof, and in which is shown by way of illustration specific embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the claims.

Embodiments of the present invention include communications devices that utilize a relative time reference to mark the start and end of system statistics reporting periods. Embodiments of the present invention also include communications devices that utilize a relative time reference to mark the start and end of system statistics reporting periods and a time offset value to report or relate them to chronological time. Embodiments of the present invention additionally include G.SHDSL devices that utilize a relative time reference to mark the start and end of system statistics reporting periods.

As stated above, in communications devices the start and end of the system statistics time intervals typically are marked or indicated by a chronological time reference or absolute time clock, generally referred to as an absolute time reference. Embodiments of the present invention utilize a relative time reference that is not tied to chronological time in the collection of system statistics. This relative time reference is specifically not updated when any communications device or system associated absolute time references are changed. The relative time reference therefore allows for system statistics gathering and recording to continue uninterrupted and therefore maintain a contiguous whole.

The system statistics are then reported when requested by an administrator or management program "as is" or are corrected/adjusted for reporting by the use of a "time offset value" that records the differences between the relative time reference and the absolute time reference or chronological time. When the absolute time reference is adjusted or changed a new time offset value is recorded to be used with future system statistics reports.

Figure 1:
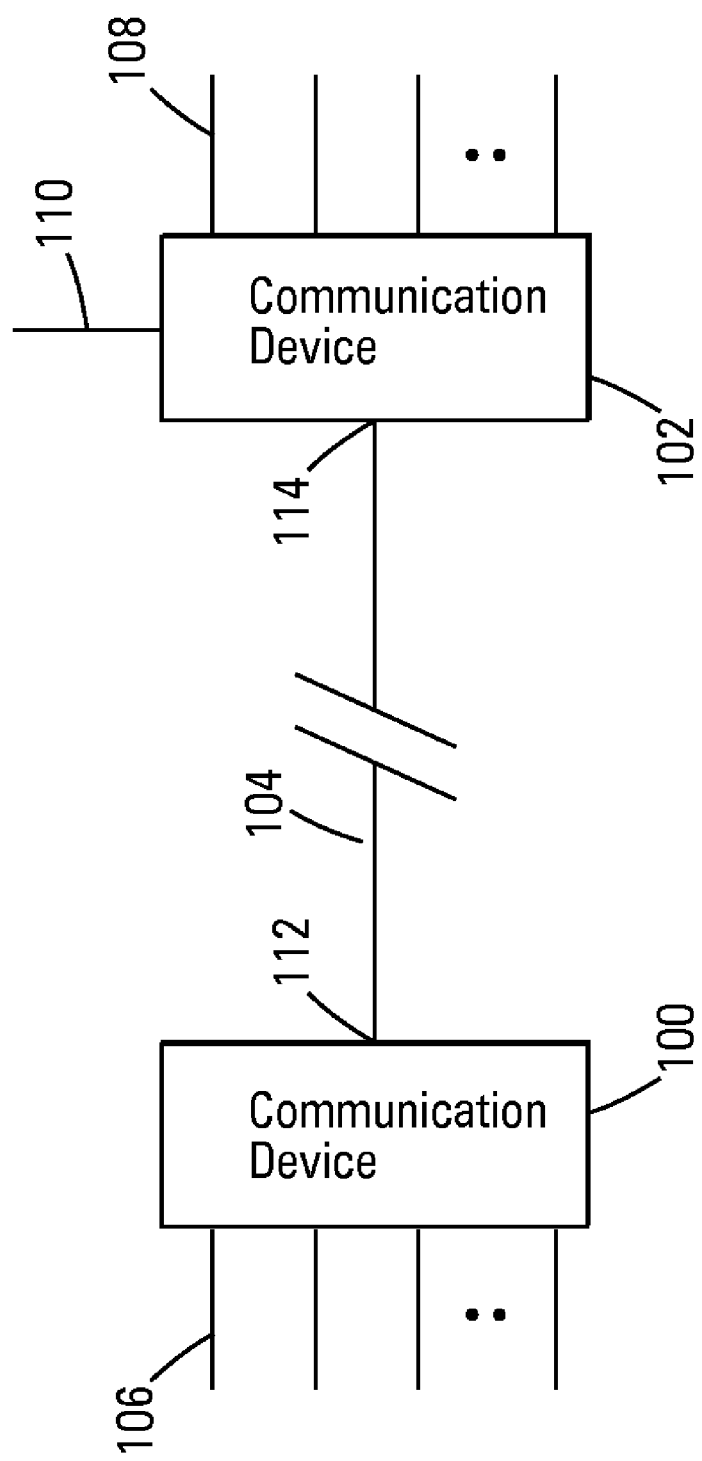
FIG. 1 is a simplified diagram of a communication link with communications devices.

FIG. 1 details a simplified block diagram of two communications devices 100, 102 coupled by a communications link 104 through their wide area network (WAN) dataports 112, 114. Each communications device 100, 102 has one or more local area network (LAN) dataports 106, 108 and/or additional WAN dataports 110.

Figure 2:
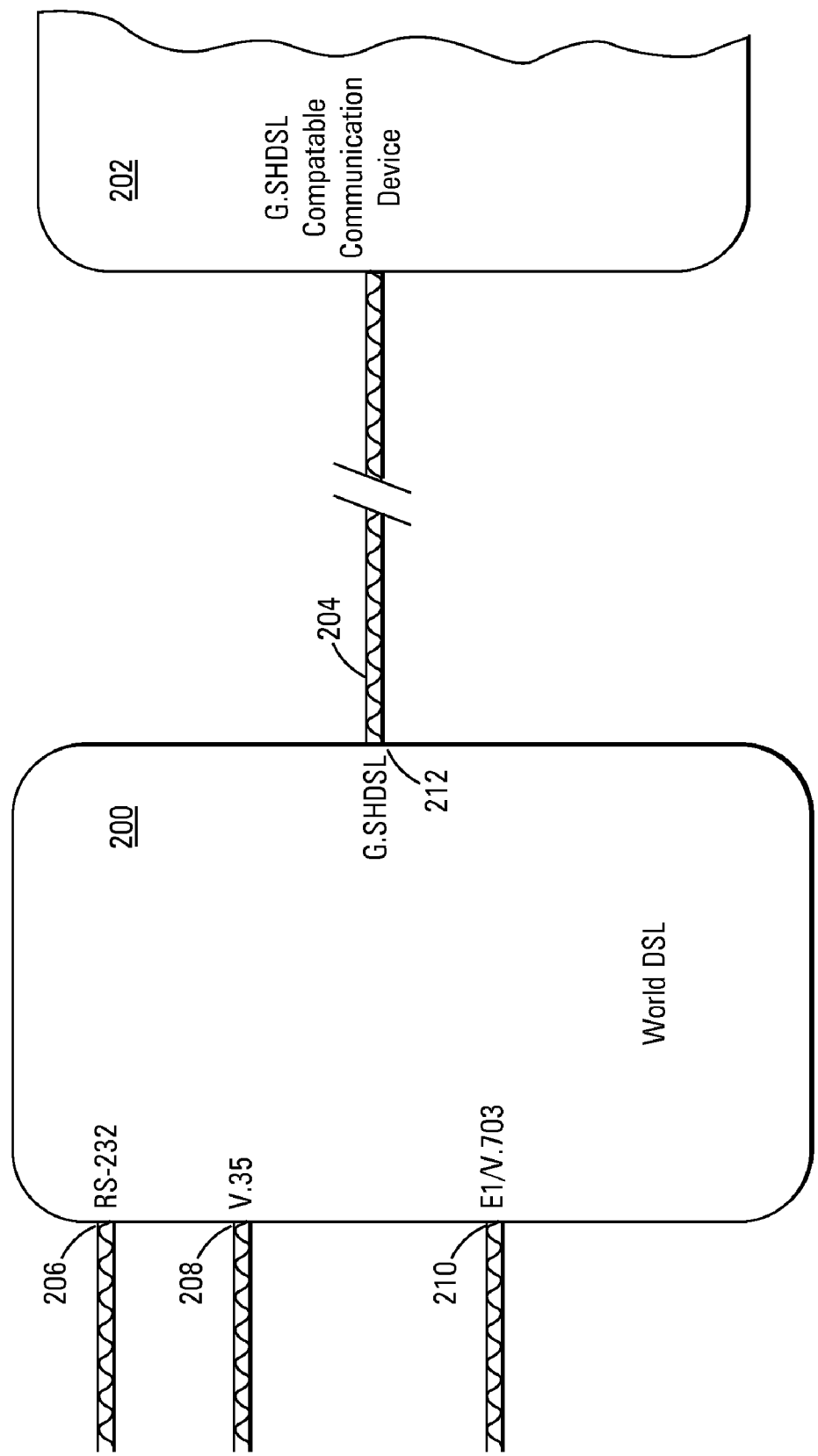
FIG. 2 is a simplified diagram of a G.SHDSL compatible modem.

FIG. 2 details a simplified block diagram of one embodiment of a G.SHDSL modem 200 made by ADC Telecommunications, Inc. Eden Prairie, Minn. The G.SHDSL modem 200 of FIG. 2 is detailed coupled to a G.SHDSL compatible communications device 202 through a G.SHDSL communications link 204. The G.SHDSL modem 200 contains several local LAN dataports that include a serial (RS-232) dataport 206, a V.35 dataport 208, and an E1 dataport 210. The G.SHDSL modem 200 also includes a G.SHDSL WAN dataport 212 that is coupled to the G.SHDSL communications link 204. The G.SHDSL modem 200 can be physically implemented in several forms and configurations. One such implementation is as a standalone unit with its own enclosure and power supply. Another such unit is as a line card in a G.SHDSL network card chassis with a shared power supply, chassis backplane communication connections, and chassis card management.

In addition to system status statistics, the G.SHDSL modem 200 of FIG. 2 collects ES, SES, and UAS statistics for the E1 dataport, and CV, ES, SES, and UAS statistics for the G.SHDSL dataport over 15 minute time intervals for 96 entries in a day or 24-hour time period. The current 15-minute time interval statistics counters are pushed into a 95-entry queue that runs for the current 24-hour period. The current 15-minute time interval statistics counters are also added to a current day (since midnight) counter. The oldest 15-minute interval statistics record is discarded, and the current 15-minute statistics counters are cleared to zero at the expiration of every 15-minute reporting period. When reporting out the gathered system statistics to an administrator or management program, every 15-minute transition is in one embodiment aligned to the nearest time/date setting (i.e. 12:45, 13:00, 13:15, etc.).

In one embodiment of the present invention, the G.SHDSL modem 200 utilizes a system statistics storage arrangement that has an additional stage of system statistics summarization and storage. In this embodiment, the G.SHDSL modem 200 collects system statistics in 15-minute increments for the current 24-hour period. When a new 15-minute interval is started, the oldest 15-minute interval system statistics are then summarized into a 1-hour system statistics summary. The 1-hour system statistics summaries are then kept by the G.SHDSL modem 200 for a 48-hour period that represents the most recent 48-hour period outside of the current 24-hour period that is stored in 15-minute time intervals. At the end of the 48-hour period the oldest 1-hour system statistics report is then summarized into a 24-hour system statistics report. The 24-hour system statistics reports are then kept for a predetermined time period and then discarded. Such a staged storage arrangement allows for the retention of increased system statistics details in the area of most likely interest while minimizing the overall storage requirements of the system statistics on the G.SHDSL modem 200.

Figure 3:
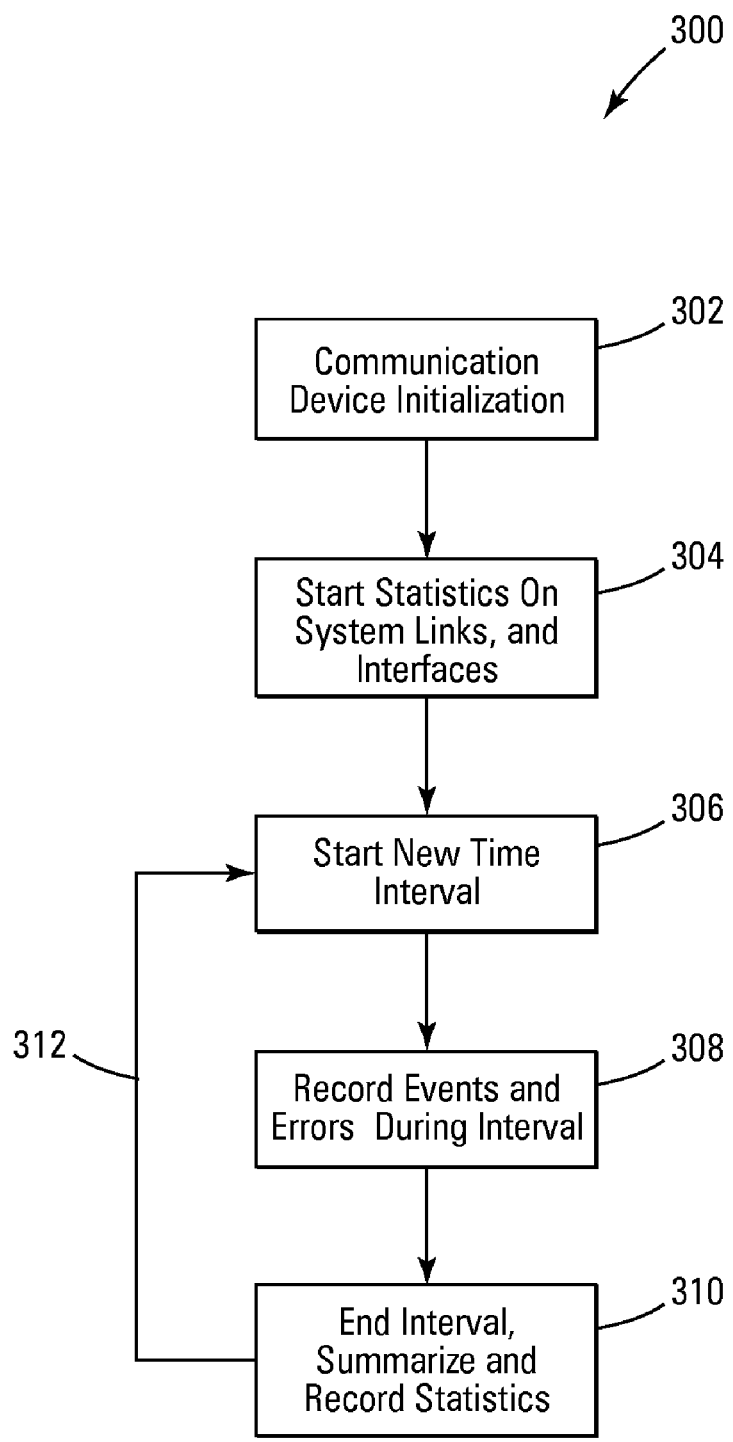
FIG. 3 is a simplified flowchart of a communications device relative time reference performance statistics gathering process.

FIG. 3 is a simplified flowchart diagram of a relative time reference statistics gathering process 300 of a communications device of an embodiment of the present invention. In the relative time reference statistics gathering process 300, the communications device initializes 302 at startup or power up and the relative time reference (not shown) is started. System statistics gathering is started after initialization on the communications device, links, and dataports 304. A new reporting period time interval is started 306 and the events and errors that are part of the system statistics of the communications device being monitored are collected 308. The reporting period time interval ends when marked by the relative time reference (not shown) and selected time interval. The system statistics are then summarized and recorded or pushed onto the queue 310. The process then loops 312 and starts another new reporting period time interval 306. The system statistics gathering process continues looping in this manner until the communications devices halts the process or is powered down. The relative time reference is not changed when any absolute time references in the communications devices are updated or changed, allowing the relative time reference statistics gathering process 300 to continue uninterrupted.

Reporting system statistics in embodiments of the present invention are in various embodiments of the present invention direct reporting of the relative time reference gathered system statistics, or indirect reporting with the use of an interpolation method to better relate the gathered system statistics to chronological time or an absolute time reference. The methods of interpolation can include, but are not limited to, utilization of an absolute time reference offset, use of a weighted averaging of the system statistics, simple approximation of the relative time reporting periods to the nearest absolute time reporting period match, etc.

Figure 4:
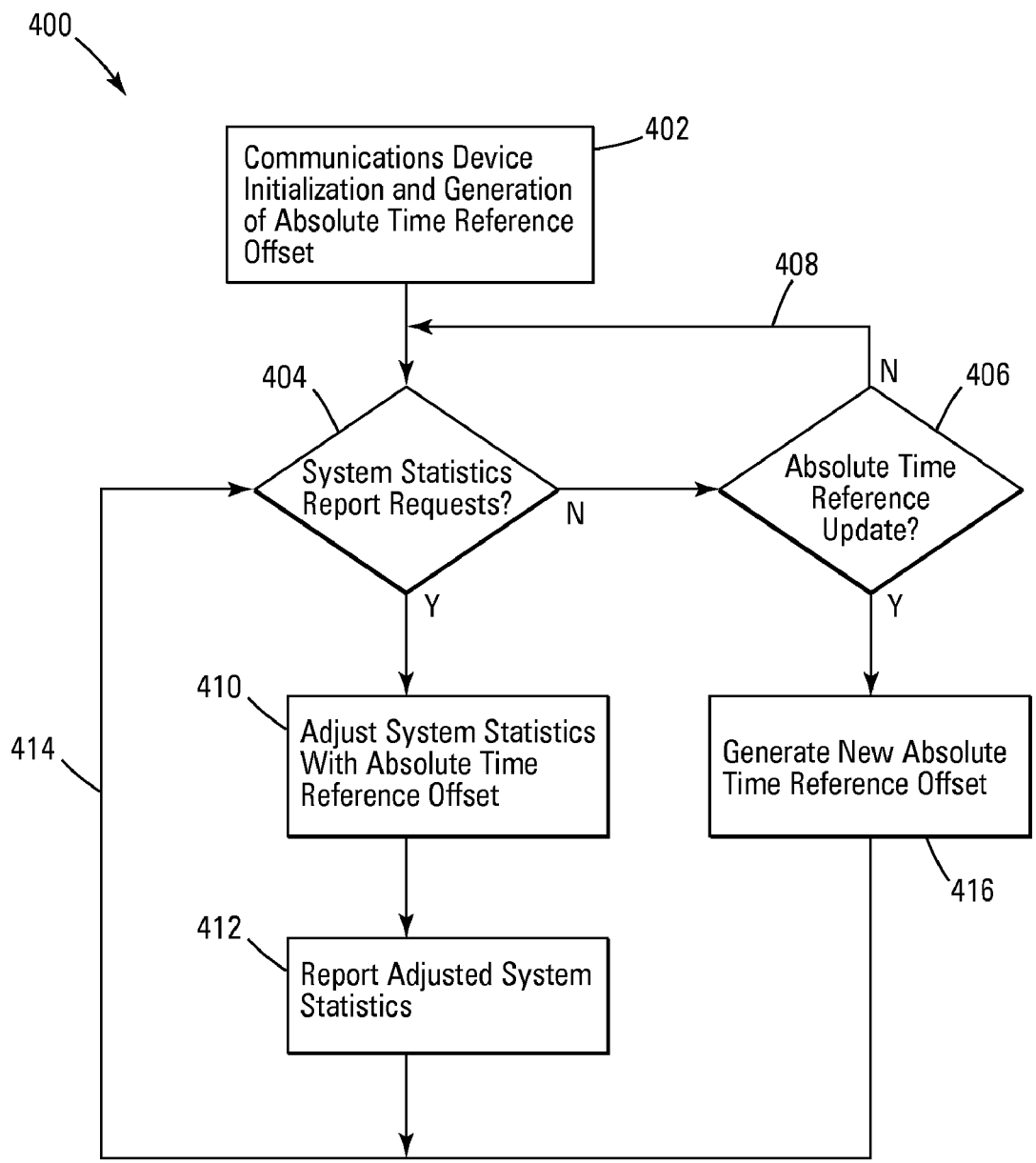
FIG. 4 is a simplified flowchart of a communications device relative time reference performance statistics gathering time offset reporting process.

FIG. 4 is a simplified flowchart of a relative time reference performance statistics gathering time offset reporting process 400 of a communications device of one embodiment of the present invention. In the relative time offset reporting process 400, the communications device initializes 402 at startup or power up and the relative time reference (not shown) is started. Also at initialization, the relative time reference is compared to the absolute time reference (not shown) that is to be used for system statistics reporting and an "offset" is generated. The offset is the difference between the relative time reference and the absolute time reference. System statistics gathering is started after initialization on the communications device, links, and dataports (not shown). After initialization of the communications device, the relative time offset reporting process 400 checks for the arrival of a system statistics report request 404. If no system statistics report request has arrived it checks if the absolute time reference has been changed or updated 406. If the absolute time reference has not been changed or updated, the process loops 408 to check again for a system statistics report request 404. If a system statistics report request 404 arrives, the relative time offset reporting process 400 retrieves the requested system statistics and adjusts them utilizing the absolute time reference offset and a selected interpolation method 410. The relative time offset reporting process 400 then reports the adjusted system statistics to the requester 412 and loops 414 to check for additional requests or changes in the absolute time reference. If the absolute time reference has been changed or adjusted 406, the relative time offset reporting process 400 generates a new absolute time reference offset 416 and loops 414 to check for additional requests or changes in the absolute time reference. The relative time offset reporting process 400 continues looping in this manner until the communications devices halts the process or is powered down.

Alternative communications device embodiments of the present invention with the ability to record and display system statistics in relation to a relative time reference will be apparent to those skilled in the art with the benefit of the present disclosure, and are also within the scope of the present invention.

CONCLUSION

A communications device apparatus and method are described that allows for improved system statistics gathering of network communication links, dataports, and system status. The improved communications device apparatus and method utilizes a relative time reference or clock for the determination of the starting and ending of system statistics gathering time periods. Thus allowing for the contiguous gathering of system statistics without errors or gaps caused by time changes made to an absolute time reference.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A method of collecting system statistics in a telecommunications device, comprising:
  generating a sequence of time intervals from a relative time reference such that the duration of each time interval is independent of adjustments to an absolute time reference;
  gathering system statistics on a telecommunications device over the duration of each time interval; and
  storing a summarized record of the telecommunications device system statistics for the time interval at the conclusion of each selected time interval.

2. The method of claim 1, further comprising:
  receiving a system statistics report request; and
  sending the requested system statistics to the requestor.

3. The method of claim 2, wherein sending the requested system statistics further comprises adjusting the system statistics relative to the absolute time reference with a time offset value.

4. The method of claim 3, further comprising regenerating the time offset value when the absolute time reference is adjusted.

5. The method of claim 1, wherein the time interval is 15 minutes or 10 minutes.

6. The method of claim 1, wherein storing a summarized record of the telecommunications device system statistics comprises storing a summarized record of the telecommunications device system statistics for each time interval at the conclusion of each time interval.

7. A telecommunications device, comprising:
  at least one communication link interface;
  a relative time reference clock configured to mark the start and end of time intervals such that the duration of each time interval is independent of adjustments to an absolute time reference;
  a system statistics monitor, wherein the system statistics monitor gathers and stores statistics on the operation of the telecommunications device and the at least one communication link interface over the duration of a sequence of selected time intervals as defined by the relative time reference clock.

8. The telecommunications device of claim 7, wherein the telecommunications device receives and responds to a request for a system statistics report.

9. The telecommunications device of claim 7, wherein the telecommunications device is a G.SHDSL telecommunications device.

10. The telecommunications device of claim 7, wherein the time interval is 15 minutes or 10 minutes.

11. The telecommunications device of claim 7, wherein the system statistics monitor is configured to adjust the gathered system statistics relative to the absolute time reference with a time offset value.

12. The telecommunications device of claim 11, wherein the telecommunications device regenerates the time offset value when the absolute time reference is adjusted.

13. A machine-usable medium having machine readable instructions stored thereon for execution by a processor of a telecommunications device to perform a method comprising:
  generating a sequence of time intervals from a relative time reference such that the duration of each time interval is independent of adjustments to an absolute time reference;
  gathering performance statistics on a telecommunications device over the duration of each time interval; and
  storing a summarized record of the telecommunications device performance statistics for the time interval at the conclusion of each selected time interval.

14. In a telecommunications device having at least one communication link interface, a relative time reference clock, and a performance statistics monitor, a performance statistics monitor method, comprising:
  generating a sequence of time intervals from a relative time reference such that the duration of each time interval is independent of adjustments to an absolute time reference;
  gathering performance statistics on a telecommunications device over the duration of each time interval; and
  storing a summarized record of the telecommunications device performance statistics for the time interval at the conclusion of each selected time interval.

15. A method of collecting performance statistics in a G.SHDSL compatible device, comprising:
  generating a sequence of time intervals from a relative time reference such that the duration of each time interval is independent of adjustments to an absolute time reference;
  gathering performance statistics on a G.SHDSL compatible device over the duration of each time interval; and
  storing a summarized record of the G.SHDSL compatible device performance statistics for the time interval at the conclusion of each selected time interval.

16. The method of claim 15, further comprising:
  receiving a performance statistics report request; and
  sending the requested system statistics to the requestor.

* * * * *